United States Patent
Huang et al.

(10) Patent No.: US 12,359,454 B2
(45) Date of Patent: *Jul. 15, 2025

(54) JOINT FOR ABOVE GROUND POOL FRAME

(71) Applicant: Intex Marketing Ltd., Tortola (VG)

(72) Inventors: Zhi Xiong Huang, Fujian (CN); Ai Ming Tan, Fujian (CN); Yaw Yuan Hsu, Fujian (CN)

(73) Assignee: Intex Marketing Ltd., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,725

(22) Filed: Feb. 15, 2024

(65) Prior Publication Data
US 2024/0301711 A1 Sep. 12, 2024

Related U.S. Application Data

(60) Division of application No. 18/124,103, filed on Mar. 21, 2023, now Pat. No. 12,134,911, which is a
(Continued)

(30) Foreign Application Priority Data

Sep. 17, 2018 (CN) .......................... 201821518351.1
Apr. 12, 2019 (CN) .......................... 201920498611.1

(51) Int. Cl.
*E04H 4/00* (2006.01)
*F16B 7/04* (2006.01)

(52) U.S. Cl.
CPC ......... *E04H 4/0056* (2013.01); *F16B 7/0406* (2013.01); *F16B 7/042* (2013.01)

(58) Field of Classification Search
CPC ....... E04H 4/0056; F16B 7/0406; F16B 7/042
(Continued)

(56) References Cited

U.S. PATENT DOCUMENTS 1,786,613 A 12/1930 Hooper
1,884,410 A 10/1932 Mncent
(Continued)

FOREIGN PATENT DOCUMENTS

CL 201502321 8/2015
CN 2195595 Y 4/1995
(Continued)

OTHER PUBLICATIONS

Appellant's Brief on Appeal (37 C.F.R. 41.31), filed with the U.S. Patent and Trademark Office, dated Apr. 5, 2022, for U.S. Appl. No. 16/220,484; 14 pages.
(Continued)

*Primary Examiner* — Huyen D Le
(74) *Attorney, Agent, or Firm* — Faegre Drinker Biddle & Reath LLP

(57) ABSTRACT

An above ground frame pool is disclosed including a frame assembly and a liner supported by the frame assembly. The frame assembly includes a plurality of horizontal pipes, a plurality of vertical pipes, and a plurality of T-shaped joints. The joints may lack mechanical fasteners with adjacent pipes or corresponding apertures. The joints may be one-piece or multi-piece structures. Such joints may be water-resistant and convenient to manufacture, assemble, disassemble, and store.

20 Claims, 12 Drawing Sheets

Related U.S. Application Data continuation of application No. 17/276,885, filed as application No. PCT/IB2019/057831 on Sep. 17, 2019, now Pat. No. 11,655,644.

(58) Field of Classification Search
USPC .................................................. 4/506
See application file for complete search history.

(56) References Cited

U.S. PATENT DOCUMENTS

| | | |
|---|---|---|
| D174,950 S | 6/1955 | Frishberg |
| 3,225,362 A | 12/1965 | Barrera |
| 3,424,178 A | 1/1969 | Yoshimi |
| 3,595,180 A | 7/1971 | Swoyer |
| 3,654,640 A | 4/1972 | Katzman |
| 3,864,048 A | 2/1975 | Parker |
| 3,874,132 A | 4/1975 | Mendelow et al. |
| 3,877,491 A | 4/1975 | Thastrup |
| 4,323,319 A | 4/1982 | Adams |
| 4,356,933 A | 11/1982 | Connolly |
| D304,486 S | 11/1989 | Elder et al. |
| 4,890,343 A | 1/1990 | Schlags |
| 5,054,135 A | 10/1991 | Dallaire et al. |
| 5,083,327 A | 1/1992 | Gillebaard |
| 5,143,476 A | 9/1992 | Pruis |
| D343,889 S | 2/1994 | Stonecypher |
| D348,723 S | 7/1994 | Carroll |
| D361,847 S | 8/1995 | Cetrulo |
| 5,927,363 A | 7/1999 | Olsen |
| D417,918 S | 12/1999 | Mussa |
| D420,145 S | 2/2000 | Mussa |
| D420,146 S | 2/2000 | Mussa |
| 6,079,894 A | 6/2000 | Obitts |
| 6,272,696 B1 | 8/2001 | Sobel et al. |
| D453,553 S | 2/2002 | Maerz |
| D454,205 S | 3/2002 | Spicer |
| D454,940 S | 3/2002 | Hoenig |
| D455,950 S | 4/2002 | Unwin et al. |
| 6,477,721 B2 | 11/2002 | Lee |
| D472,648 S | 4/2003 | Linsley |
| 6,595,713 B1 | 7/2003 | Wilson |
| 6,604,250 B1 | 8/2003 | Lee |
| D481,110 S | 10/2003 | Snyder et al. |
| D495,434 S | 8/2004 | Cooper |
| 6,803,007 B2 | 10/2004 | Meggiolan |
| D504,523 S | 4/2005 | Gimpel et al. |
| D567,394 S | 4/2008 | Pena |
| D580,530 S | 11/2008 | McAlpine |
| D592,492 S | 5/2009 | Werschmidt |
| D599,446 S | 9/2009 | Price et al. |
| D626,405 S | 11/2010 | Goad |
| D654,353 S | 2/2012 | Tabler |
| D676,942 S | 2/2013 | Kluss et al. |
| D707,366 S | 6/2014 | Rowland |
| D718,853 S | 12/2014 | Lee |
| D755,940 S | 5/2016 | Schulze |
| D759,889 S | 6/2016 | Seehof et al. |
| D760,425 S | 6/2016 | Seehof et al. |
| D770,599 S | 11/2016 | Daughters |
| D771,779 S | 11/2016 | Scifres et al. |
| D805,165 S | 12/2017 | Dean et al. |
| D815,300 S | 4/2018 | Lin et al. |
| D874,021 S | 1/2020 | Huang et al. |
| D900,286 S | 10/2020 | Daughters |
| D905,832 S | 12/2020 | Gray |
| D908,849 S | 1/2021 | Decaria et al. |
| D925,011 S | 7/2021 | Parihar et al. |
| D926,295 S | 7/2021 | Zhang |
| D930,802 S | 9/2021 | Huang et al. |
| 11,225,805 B2 | 1/2022 | Huang et al. |
| D943,715 S | 2/2022 | Kwak et al. |
| D945,871 S | 3/2022 | Macdonald |
| D946,129 S | 3/2022 | Luo |
| D956,267 S | 6/2022 | Zhang |
| D956,937 S | 7/2022 | Dewitt et al. |
| D957,241 S | 7/2022 | Deng |
| D957,592 S | 7/2022 | Downie et al. |
| D959,617 S | 8/2022 | Meng |
| D963,812 S | 9/2022 | Cherry |
| D965,117 S | 9/2022 | Hanson et al. |
| 11,459,781 B2 | 10/2022 | Huang et al. |
| D980,959 S | 3/2023 | Huang et al. |
| D983,339 S | 4/2023 | Huang et al. |
| D985,108 S | 5/2023 | Huang et al. |
| 11,655,644 B2 * | 5/2023 | Huang .............. F16B 7/042 4/506 |
| 11,692,572 B2 | 7/2023 | Lin et al. |
| 11,692,573 B2 | 7/2023 | Lin et al. |
| 12,134,911 B2 * | 11/2024 | Huang .............. E04H 4/0056 |
| 2001/0037620 A1 | 11/2001 | Choi |
| 2002/0042948 A1 | 4/2002 | Lee |
| 2002/0064420 A1 | 5/2002 | Lin |
| 2003/0001387 A1 | 1/2003 | Tawara et al. |
| 2004/0071496 A1 * | 4/2004 | Chun Yueh ............ A63B 5/11 403/14 |
| 2004/0118844 A1 | 6/2004 | Bennett et al. |
| 2007/0068584 A1 | 3/2007 | Murdock et al. |
| 2008/0314466 A1 | 12/2008 | Cimberio et al. |
| 2009/0144892 A1 | 6/2009 | Brindle |
| 2009/0205121 A1 | 8/2009 | Cheng |
| 2010/0083437 A1 | 4/2010 | Hui |
| 2014/0325751 A1 | 11/2014 | Hake |
| 2015/0115186 A1 | 4/2015 | Borland et al. |
| 2016/0201348 A1 | 7/2016 | Liu |
| 2016/0215513 A1 | 7/2016 | Liu |
| 2016/0222686 A1 | 8/2016 | Liu |
| 2017/0009475 A1 | 1/2017 | Liu |
| 2017/0089085 A1 | 3/2017 | Liu |
| 2017/0356206 A1 | 12/2017 | Huang |
| 2019/0032796 A1 | 1/2019 | Di Monte |
| 2019/0178275 A1 | 6/2019 | Lin et al. |
| 2020/0141143 A1 | 5/2020 | Huang et al. |
| 2020/0332544 A1 | 10/2020 | Huang et al. |
| 2021/0324648 A1 | 10/2021 | Huang et al. |
| 2021/0348409 A1 | 11/2021 | Chen et al. |
| 2022/0034113 A1 | 2/2022 | Huang et al. |
| 2022/0275661 A1 | 9/2022 | Huang et al. |
| 2023/0052458 A1 | 2/2023 | Lin et al. |
| 2023/0228114 A1 | 7/2023 | Huang et al. |
| 2024/0003368 A1 | 1/2024 | Lin et al. |
| 2024/0247670 A1 | 7/2024 | Lin et al. |

FOREIGN PATENT DOCUMENTS

| | | |
|---|---|---|
| CN | 2480479 Y | 3/2002 |
| CN | 2766083 Y | 3/2006 |
| CN | 200968073 Y | 10/2007 |
| CN | 201487444 U | 5/2010 |
| CN | 101787807 A | 7/2010 |
| CN | 202745430 U | 2/2013 |
| CN | 204475913 U | 7/2015 |
| CN | 204475914 U | 7/2015 |
| CN | 204531509 U | 8/2015 |
| CN | 205777703 U | 12/2016 |
| CN | 206054469 U | 3/2017 |
| CN | 206477627 U | 9/2017 |
| CN | 207673066 U | 7/2018 |
| CN | 209040623 U | 6/2019 |
| CN | 209130364 U | 7/2019 |
| DE | 8810857 U1 | 10/1988 |
| DE | 9104915 U1 | 8/1991 |
| DE | 19904335 A1 | 8/1999 |
| EP | 3103939 A2 | 12/2016 |
| FR | 2774416 A1 | 8/1999 |
| GB | 2349412 A | 11/2000 |
| RU | 009029 U1 | 1/1999 |
| RU | 028886 U1 | 4/2003 |
| RU | 178000 U1 | 3/2018 |

(56) References Cited

FOREIGN PATENT DOCUMENTS

| WO | 2014/100855 A1 | 7/2014 |
|---|---|---|
| WO | 2017/218904 A1 | 12/2017 |

OTHER PUBLICATIONS

Best Way https://www.amazon.com/Steel-Pro-Frame-Pool-Set/dp/B00HZAM07U/ref=sr_1_24?dchild=1&keywords=above+ground+frame+pool&qid=1605540738&sr=8-24 (Year: 2017).
European Search Report issued by the European Patent Office on Apr. 26, 2022, for European Patent Application No. 19862486.8, issued on Apr. 26, 2022; 7 pages.
Examiner's Answer, issued by the U.S. Patent Trial and Appeal Board, dated Aug. 10, 2022, for U.S. Appl. No. 16/220,484; 9 pages.
Final Office Action, issued by the U.S. Patent and Trademark Office, dated Apr. 3, 2023, for U.S. Appl. No. 17/962,979; 7 pages.
Final Office Action, issued by the U.S. Patent and Trademark Office, dated Nov. 5, 2021, for U.S. Appl. No. 16/220,484; 17 pages.
Final Office Action, issued by the U.S. Patent and Trademark Office, dated Nov. 6, 2020, for U.S. Appl. No. 16/220,484; 15 pages.
http://hardware-store-online.com/berater/intex-ultra-frame-pool-horizontal-beam#more-infos Retrieved Jul. 31, 2017.
International Preliminary Report on Patentability received for PCT Patent Application No. PCT/US2017/037892, mailed on Dec. 27, 2018, 9 pages.
International Preliminary Reporton Patentability received for PCT Patent Application No. PCT/IB2019/057831, mailed on Mar. 25, 2021, 7 pages.
International Search Report and Written Opinion dated Aug. 24, 2017 in corresponding International Application No. PCT/US2017/037892.
International Search Report and Written Opinion received for PCT Patent Application No. PCT/IB2019/057831, mailed on Dec. 20, 2019, 9 pages.
Intex, 2013 Above Ground Pools Catalogue, Copyright 2012, 13 pages.
Intex, Ultra FrameTM Pool Owner's Manual, May 13, 2015, 17 pages.
Killife Pool Cart https://www.amazon.com/KITLIFE-Storage-Resistant-Cracking-Included/dp/B08B46LM5N/ (Year: 2018).
Intex, Ultra Frame Pool Owners Manual, May 13, 2015, 17 pages, available at https://www.poolcenter.com/images/PDFs/IntexUltraFrameRound_manual.pdf.
Non-Final Office Action, issued by the U.S. Patent and Trademark Office, dated Apr. 17, 2020, for U.S. Appl. No. 16/220,484; 12 pages.
Non-Final Office Action, issued by the U.S. Patent and Trademark Office, dated Apr. 9, 2021, for U.S. Appl. No. 16/220,484; 14 pages.
Non-Final Office Action, issued by the U.S. Patent and Trademark Office, dated Aug. 4, 2022, for U.S. Appl. No. 17/276,885; 10 pages.
Non-Final Office Action, issued by the U.S. Patent and Trademark Office, dated Dec. 20, 2022, for U.S. Appl. No. 17/962,979; 12 pages.
Notice of Panel Decision from Pre-Appeal Brief Review, issued by the U.S. Patent and Trademark Office, dated Jan. 10, 2022, for U.S. Appl. No. 16/220,484; 2 pages.
Plumbingsupply.com, "Incredible Selection of PVC Fittings, Sch.40 PVC fillings and Sch.80 PVC Adapters," The Wayback Machine—https://web.archive.org/web/20180701150048/https://www.plumbingsupply.com, (Copyrights) 1995-2018 PlumbingSupply.com, 127 pages.
Pre-Appeal Brief Request for Review, filed with the U.S. Patent and Trademark Office, dated Dec. 16, 2021, for U.S. Appl. No. 16/220,484; 4 pages.
Response to Final Office Action, filed with the U.S. Patent and Trademark Office, dated Apr. 3, 2023, for U.S. Appl. No. 17/962,979; 7 pages.
Response to Final Office Action, filed with the U.S. Patent and Trademark Office, dated Aug. 10, 2022, for U.S. Appl. No. 16/220,484; 11 pages.
Response to Final Office Action, filed with the U.S. Patent and Trademark Office, dated Mar. 8, 2021, for U.S. Appl. No. 16/220,484; 11 pages.
Response to Non-Final Office Action, filed with the U.S. Patent and Trademark Office, dated Aug. 17, 2020, for U.S. Appl. No. 16/220,484; 9 pages.
Response to Non-Final Office Action, filed with the U.S. Patent and Trademark Office, dated Mar. 20, 2023, for U.S. Appl. No. 17/962,979; 11 pages.
Response to Non-Final Office Action, filed with the U.S. Patent and Trademark Office, dated Sep. 9, 2021, for U.S. Appl. No. 16/220,484; 11 pages.
Response to Non-Final Office Action, issued by the U.S. Patent and Trademark Office, dated Nov. 3, 2022, for U.S. Appl. No. 17/276,885; 8 pages.
Small Rectangular Metal Frame Pool 177-1/4" × 86-5/8" × 33" (450 cm × 220 cm × 84 cm) Owner's Manual, Intex Marketing Ltd., copyright 2012; 14 pages.
Summer https://www.amazon.com/Summer-Waves-Premium-Swimming-Accessory/dp/B07BXC85HG/ (Year: 2018).
Patent Owner's Preliminary Response, *Bestway (USA), Inc. v. Intex Marketing Ltd.*, Case No. PGR2024-00036, U.S. Pat. No. 11,959,512, dated Aug. 8, 2024; 12 pages.
Statutory Disclaimer, Intex Marketing Ltd.- the '512 Patent; 2 pages.
Petitioner's Preliminary Reply, *Bestway (USA), Inc. v. Intex Marketing Ltd.*, Case No. PGR2024-00036, the '512 Patent, dated Aug. 21, 2024; 9 pages.
Patent Owner's Preliminary Surreply, *Bestway (USA), Inc. v. Intex Marketing Ltd.*, Case No. PGR2024-00036, the '512 Patent, dated Aug. 28, 2024; 7 pages.
Decision Denying Institution of Post-Grant Review under 35 U.S.C. 324, in *Bestway (USA), Inc. v. Intex Marketing Ltd.*, PGR2024-00036, Patent 11,959,512, dated Oct. 28, 2024; 9 pages.
Petition for Post Grant Review, *Bestway (USA), Inc. v. Intex Marketing Ltd.*, Case No. PGR2024-00036, U.S. Pat. No. 11,959,512, dated Jun. 15, 2024; 157 pages.
EX1001—U.S. Pat. No. 11,959,512, ("the '512 Patent"); 11 pages.
EX1002—Declaration of Dr. Kimberly Cameron in Support of Petition for Post Grant Review; 181 pages.
EX1003—File History of the '512 Patent; 666 pages.
EX1004—U.S. Pat. No. 11,692,572, "the '572 Patent"; 12 pages.
EX1005—File History of the '572 Patent; 1017 pages.
EX1006—U.S. Patent Publication No. 2016/0222686 ("Liu"); 30 pages.
EX1007—U.S. Patent Publication No. 2009/0205121 ("Cheng"); 15 pages.
EX1008—PCT Publication No. WO 2014/100855 ("Hunter"); 36 pages.
EX1009—U.S. Patent Publication No. 2002/0042948 ("Lee"); 41 pages.
EX1010—Intex's 2005 Above Ground Pool Catalog; 10 pages.
EX1011—Intex's 2006 Above Ground Pool Catalog; 10 pages.
EX1012—Intex's 2007 Above Ground Pool Catalog; 18 pages.
EX1013—Intex's 2008 Above Ground Pool Catalog; 17 pages.
EX1014—Intex's 2009 Above Ground Pool Catalog; 32 pages.
EX1015—Intex's 2010 Above Ground Pool Catalog; 32 pages.
EX1016—Intex's 2011 Above Ground Pool Catalog; 38 pages.
EX1017—Intex's 2014 Above Ground Pool Catalog; 48 pages.
EX1018—Declaration of Patrizio Fumagalli in Support of Petition for Post Grant Review; 4 pages.
EX1019—Online Listings of Intex Pool, Captured by Wayback Machine of Internet Archive, May 8, 2024; 24 pages.
EX1020—(Intentionally Omitted).
EX1021—2006 Owner's Manual for Intex Pool; 15 pages.
EX1022—2011 Owner's Manual for Intex Pool; 15 pages.
EX1023—Jun. 27, 2015 YouTube Video of Intex Pool available https://www.youtube.com/watch?v=ETAiHLC89fI.
EX1024—Jul. 8, 2012 YouTube Video of Intex Pool available at https://www.youtube.com/watch?v=iiIGN5cF-YU.

(56) References Cited

OTHER PUBLICATIONS

EX1025—Jul. 28, 2012 YouTube Video of Intex Pool available at https://www.youtube.com/watch? v=1iBwYtnzYfs&t=258s.
EX1026—Cambridge English Dictionary Definition of "width"; 2 pages.
EX1027—Transcript of Chat with Intex Representative; 3 pages.
EX1028—U.S. Pat. No. 3,225,362 ("Barrera"); 6 pages.
EX1029—Intex Website https://intexcorp.com/replacement-parts/10573-corner-top-rail-joints-for-small-rectangular-frame-pools/, Jun. 11, 2019; 2 pages.
EX1030—Intex Website https://intexcorp.com/replacement-parts/cornerjoint-with-corner-seal-for-small-rectangular-frame-pool/, Jun. 11, 2024; 2 pages.
EX1031—Intex Website https://intexcorp.com/replacement-parts/10574-pins-for-small-rectangular-frame-pools/, Jun. 11, 2024; 2 pages.
EX1032—Receipt of Order of Intex Pool, Mar. 11, 2024; 2 pages.

\* cited by examiner

JOINT FOR ABOVE GROUND POOL FRAME

CROSS REFERENCE TO RELATED APPLICATIONS

The present application is a divisional of U.S. Application Ser. No. 18/124,103, filed Mar. 21, 2023, which is a continuation of U.S. application Ser. No. 17/276,885, filed Mar. 17, 2021, which is a National Stage Entry of International Application No. PCT/IB2019/057831, filed Sep. 17, 2019, which claims priority to Chinese Application No. 201821518351.1, filed Sep. 17, 2019, and Chinese Application No. 201920498611.1, filed Apr. 12, 2019, the disclosures of which are hereby expressly incorporated by reference herein in their entirety.

FIELD OF THE DISCLOSURE

The present disclosure relates to an above ground frame pool. More particularly, the present disclosure relates to an above ground frame pool including a frame assembly and a liner supported by the frame assembly, and to a method for using the same.

BACKGROUND OF THE DISCLOSURE

Above ground frame pools are popular recreational products. Such above ground pools include a frame assembly and a liner supported by the frame assembly. The frame assembly should be strong enough to support the weight of the water and swimmers in the pool during use, but should also be convenient to manufacture, assemble, disassemble, and store when not in use. The frame assembly should also be water-resistant.

SUMMARY

The present disclosure provides an above ground frame pool including a frame assembly and a liner supported by the frame assembly. The frame assembly includes a plurality of horizontal pipes, a plurality of vertical pipes, and a plurality of T-shaped joints. The joints may lack mechanical fasteners with adjacent pipes or corresponding apertures. The joints may be one-piece or multi-piece structures. Such joints may be water-resistant and convenient to manufacture, assemble, disassemble, and store.

According to an exemplary embodiment of the present disclosure, a joint is disclosed for an above ground pool having a frame assembly and a liner supported by the frame assembly. The frame assembly includes a first horizontal frame, a second horizontal frame, and a vertical frame, the joint including a first horizontal portion having a continuous outer wall configured to surround a first end of the first horizontal frame, a second horizontal portion having a continuous outer wall configured to surround a second end of the second horizontal frame, and a vertical portion positioned between the first and second horizontal portions, the vertical portion having a continuous outer wall configured to surround an upper end of the vertical frame.

In certain embodiments, the first and second horizontal portions form an included angle of less than 180 degrees.

In certain embodiments, the first horizontal portion lacks a mechanical fastener configured to mechanically couple with the first horizontal frame, the second horizontal portion lacks a mechanical fastener configured to mechanically couple with the second horizontal frame, and the vertical portion lacks a mechanical fastener configured to mechanically couple with the vertical frame.

In certain embodiments, the first horizontal portion has an inner circular cross-section, the second horizontal portion has an inner circular cross-section, and the vertical portion has an inner elliptical cross-section.

In certain embodiments, the first horizontal frame, the second horizontal frame, and the vertical frame narrow at the corresponding first, second, and upper ends, and the first horizontal portion, the second horizontal portion, and the vertical portion of the joint each narrow inwardly to accommodate the corresponding first, second, and upper ends.

In certain embodiments, the joint is made of plastic.

In certain embodiments, the first horizontal portion, the second horizontal portion, and the vertical portion are integrally molded together to form a one-piece structure.

In certain embodiments, the first horizontal portion, the second horizontal portion, and the vertical portion are mechanically coupled together to form a multi-piece structure.

According to another exemplary embodiment of the present disclosure, an above ground pool is disclosed including a frame assembly with a first horizontal frame, a second horizontal frame, a vertical frame, and a T-shaped joint friction-fit to the first horizontal frame, the second horizontal frame, and the vertical frame without any mechanical fasteners, and a liner supported by the frame assembly.

In certain embodiments, the liner includes an upper sleeve configured to receive the first and second horizontal frames, the upper sleeve defining a first horizontal area, and a side wall that defines a water cavity, the water cavity having a second horizontal area smaller than the first horizontal area.

In certain embodiments, the liner includes an upper sleeve configured to receive the first and second horizontal frames, and a side wall that defines a water cavity, the side wall being located radially inward of the upper sleeve.

In certain embodiments, the joint has a continuous outer wall surrounding respective ends of the first horizontal frame, the second horizontal frame, and the vertical frame.

In certain embodiments, the joint includes a first opening that receives the first horizontal frame, a second opening that receives the second horizontal frame, and a third opening that receives the vertical frame, wherein the first, second, and third openings are the only openings in the joint.

In certain embodiments, the first horizontal frame, the second horizontal frame, and the vertical frame have narrowing ends, and the first, second, and third openings of the joint narrow to receive the corresponding narrowing ends.

In certain embodiments, the first horizontal frame, the second horizontal frame, and the vertical frame are made of metal, and the joint is made of plastic.

In certain embodiments, the joint is a one-piece structure. In other embodiments, the joint is a multi-piece structure.

According to yet another exemplary embodiment of the present disclosure, a method is disclosed for of assembling an above ground pool including the steps of assembling a frame assembly including a plurality of T-shaped joints, the assembling step including coupling each joint to first and second horizontal frames without any mechanical fasteners and to an upper end of a vertical frame without any mechanical fasteners, positioning a lower end of the vertical frame on a support surface, and supporting a liner on the frame assembly.

In certain embodiments, the supporting step includes inserting the first and second horizontal frames in an upper sleeve of the liner and positioning a side wall of the liner radially inward of the upper sleeve.

In certain embodiments, each joint includes a first horizontal portion having a continuous outer wall surrounding a first end of the first horizontal frame, a second horizontal portion having a continuous outer wall surrounding a second end of the second horizontal frame, and a vertical portion positioned between the first and second horizontal portions, the vertical portion having a continuous outer wall surrounding the upper end of the vertical frame.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
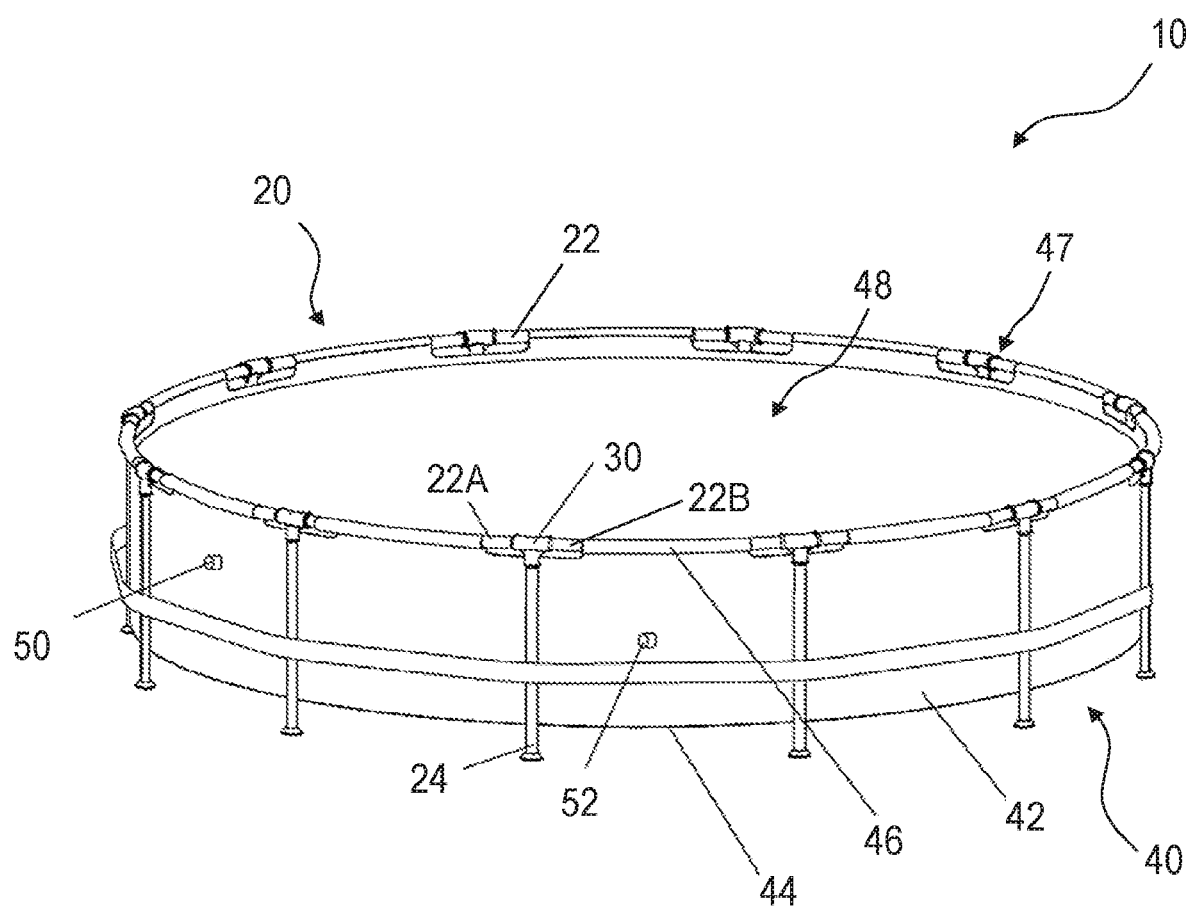
FIG. 1 is an assembled perspective view of an above ground frame pool including a frame assembly and a liner, the frame assembly including a plurality of horizontal pipes, a plurality of vertical pipes, and a plurality of T-shaped joints.
Figure 2:
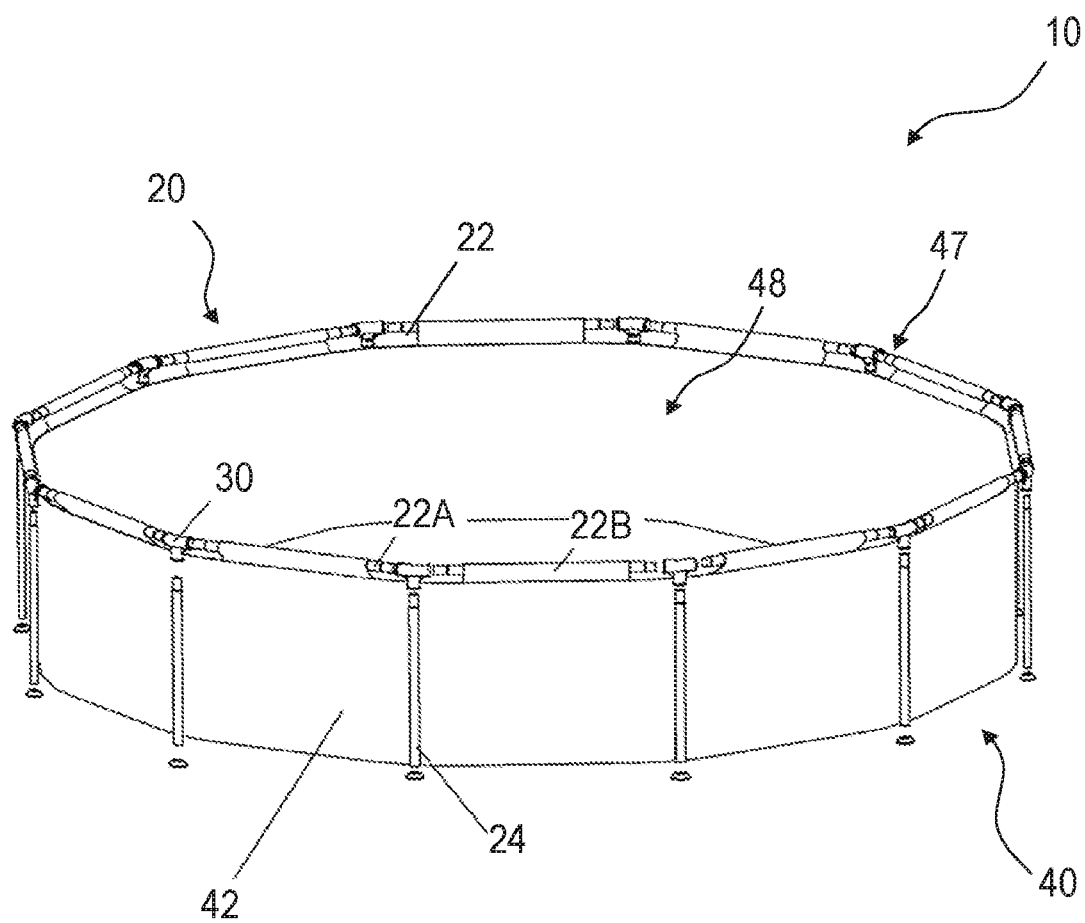
FIG. 2 is an exploded perspective view of the pool of FIG. 1.
Figure 3:
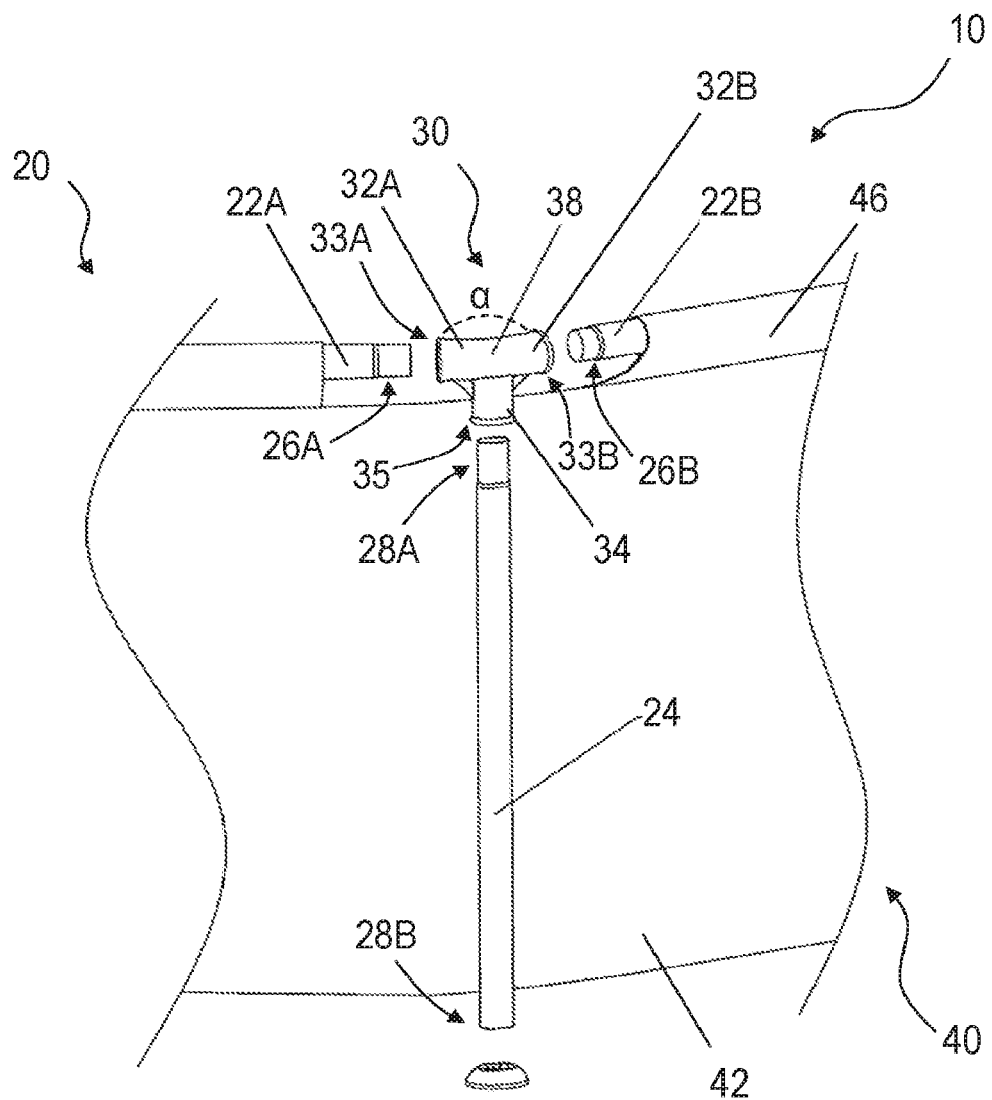
FIG. 3 is a partial enlarged view of the pool of FIG. 2 showing an exemplary one-piece T-shaped joint of the present disclosure coupled to the adjacent horizontal pipes and the adjacent vertical pipe.

Referring initially to FIGS. 1-3, an above ground frame pool 10 is shown including a frame assembly 20 and a liner 40. The frame assembly 20 may be constructed of a rigid plastic, metal, another suitable corrosion-resistant material, or combinations thereof, and the liner 40 may be constructed of a flexible plastic or another suitable waterproof material. The illustrative pool 10 is circular in shape, but it is also within the scope of the present disclosure for the pool 10 to be elliptical in shape, rectangular in shape, or other shapes.

As shown in FIGS. 1 and 2, the illustrative frame assembly 20 includes a plurality of horizontal frames or pipes 22 positioned along the perimeter of the pool 10 and a plurality of vertical frames or pipes 24 extending vertically downward to support the horizontal pipes 22 above the ground. Because the illustrative pool 10 is circular in shape, the horizontal pipes 22 are arranged in a ring-shape and positioned along the circumference of the pool 10, but it is also within the scope of the present disclosure for the horizontal pipes 22 to be arranged in other shapes to form pools 10 of different shapes. In certain embodiments, the pipes 22, 24 are constructed of metal.

As shown in FIG. 3, the illustrative frame assembly 20 also includes a plurality of T-shaped joints 30 (hereinafter, "T-joints") connecting adjacent horizontal pipes 22 and vertical pipes 24. The T-joint is substantially hollow and is configured to receive the adjacent horizontal pipes 22 and vertical pipes 24. Each T-joint 30 includes a first horizontal portion 32A with a first hollow end 33A that receives a first end 26A of an adjacent first horizontal pipe 22A, a second horizontal portion 32B with a second hollow end 33B that receives a second end 26B of an adjacent second horizontal pipe 22B, and a vertical portion 34 with a hollow end 35 that receives an upper end 28A of an adjacent vertical pipe 24. The lower end 28B of the vertical pipe 24 rests on the ground or another supporting surface. The first and second horizontal portions 32A, 32B of each T-joint 30 are bent radially inward relative to the vertical portion 34 of the T-joint 30 to form an included angle α measuring less than 180 degrees, such as an obtuse angle (i.e., between 90 degrees and 180 degrees) or a right angle (i.e., 90 degrees).

Referring still to FIG. 3, adjacent components of the frame assembly 20 may have complimentary cross-sectional profiles. In one embodiment, the inner cross-sectional profile of each T-joint 30 matches the outer cross-sectional profiles of the adjacent horizontal pipes 22A, 22B and vertical pipe 24. In FIG. 3, for example, the inner circular cross-sections of the cylindrical horizontal portions 32A, 32B match the outer circular cross-sections of the cylindrical horizontal pipes 22A, 22B, and the inner elliptical cross-section of the vertical portion 34 matches the outer elliptical cross-section of the vertical pipe 24. It is also within the scope of the present disclosure for some or all of these components to be circular in cross-section (See, for example, FIG. 6), elliptical in cross-section, rectangular in cross-section, or other shapes.

Also, adjacent components of the frame assembly 20 may have complimentary profiles over their lengths. As shown in FIG. 3, for example, portions 32A, 32B, 34 of each T-joint 30 may narrow inwardly to match the narrowing ends 26A, 26B, 28A of the respective pipes 22A, 22B, 24. See also, for example, FIG. 7.

Returning to FIGS. 1 and 2, the liner 40 is supported by the frame assembly 20. The illustrative liner 40 includes a side wall or sheet 42, a bottom wall or sheet 44, and an upper circumferential sleeve 46 configured to receive the horizontal pipes 22A, 22B of the frame assembly 20. The upper sleeve 46 may include openings 47 corresponding to the T-joints 30 to facilitate assembly and disassembly of the T-joints 30. The side wall 42 and bottom wall 44 of the liner 40 cooperate to define a water cavity 48. The side wall 42 may also include a water inlet 50 and a water outlet 52 to enable fluid communication between the water cavity 48 and an external water filtration and/or heating system (not shown).

According to an exemplary embodiment of the present disclosure, the frame assembly 20 may be held together via friction-fit connections without the need for mechanical fasteners (e.g., latches, bolts). These friction-fit connections may benefit from tensile forces acting on the frame assembly 20 from the water in the water cavity 48. In certain embodiments, the side wall 42 of the liner 40 may be located radially inward of the upper sleeve 46 of the liner 40, such that the horizontal area enclosed by the side wall 42 (i.e., the diameter of the water cavity 48) is smaller than the horizontal area enclosed by the horizontal pipes 22A, 22B in the upper sleeve 46. In this arrangement, the water may generate tensile forces upon the frame assembly 20, thereby pulling the T-joints 30 radially inward and enhancing the friction-fit connections with the horizontal pipes 22A, 22B and vertical pipes 24. As a result, and as shown in FIG. 3, the T-joint 30 may have a continuous outer wall 38 that surrounds the adjacent pipes 22A, 22B, 24, without any mechanical fasteners or corresponding apertures in the wall 38. Thus, the only openings into the T-joint 30 may be the hollow ends 33A, 33B, 35 that receive the adjacent pipes 22A, 22B, 24, respectively. Similarly, the adjacent pipes 22A, 22B, 24 may have continuous outer walls without any mechanical fasteners or corresponding apertures in the walls, other than the hollow ends that are received within the T-joint 30. The absence of mechanical fasteners may simplify the manufacturing, assembly, and disassembly of the frame assembly 20. The absence of mechanical fasteners and corresponding apertures may also improve the water-resistance of the frame assembly 20.

In the illustrated embodiment of FIG. 3, the T-joint 30 is a one-piece, integrally molded part. In other words, the first horizontal portion 32A, the second horizontal portion 32B, and the vertical portion 34 are integrally molded together (e.g., injection molded) to form the one-piece T-joint 30. In other embodiments that follow, the T-joint is a multi-piece assembly including two or more detachable pieces. The individual pieces may be constructed, assembled, and repaired in a modular manner.

Figure 4:
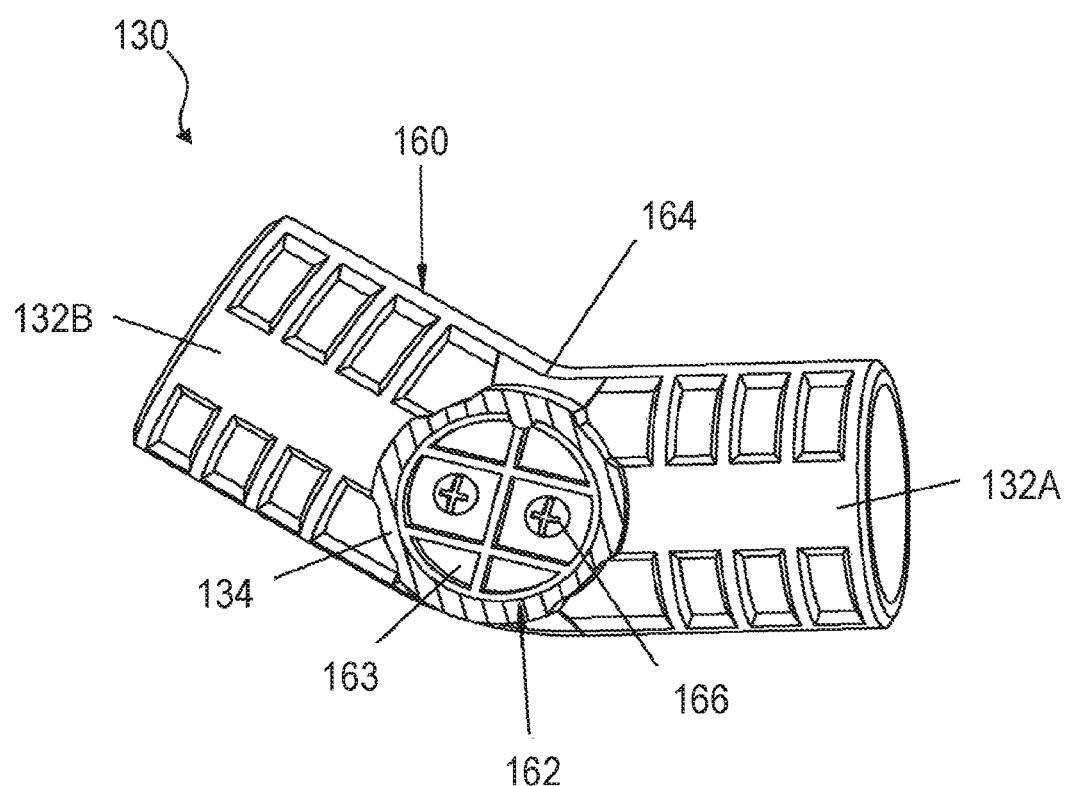
FIG. 4 is a bottom perspective view of an exemplary two-piece T-shaped joint of the present disclosure.
Figure 5:
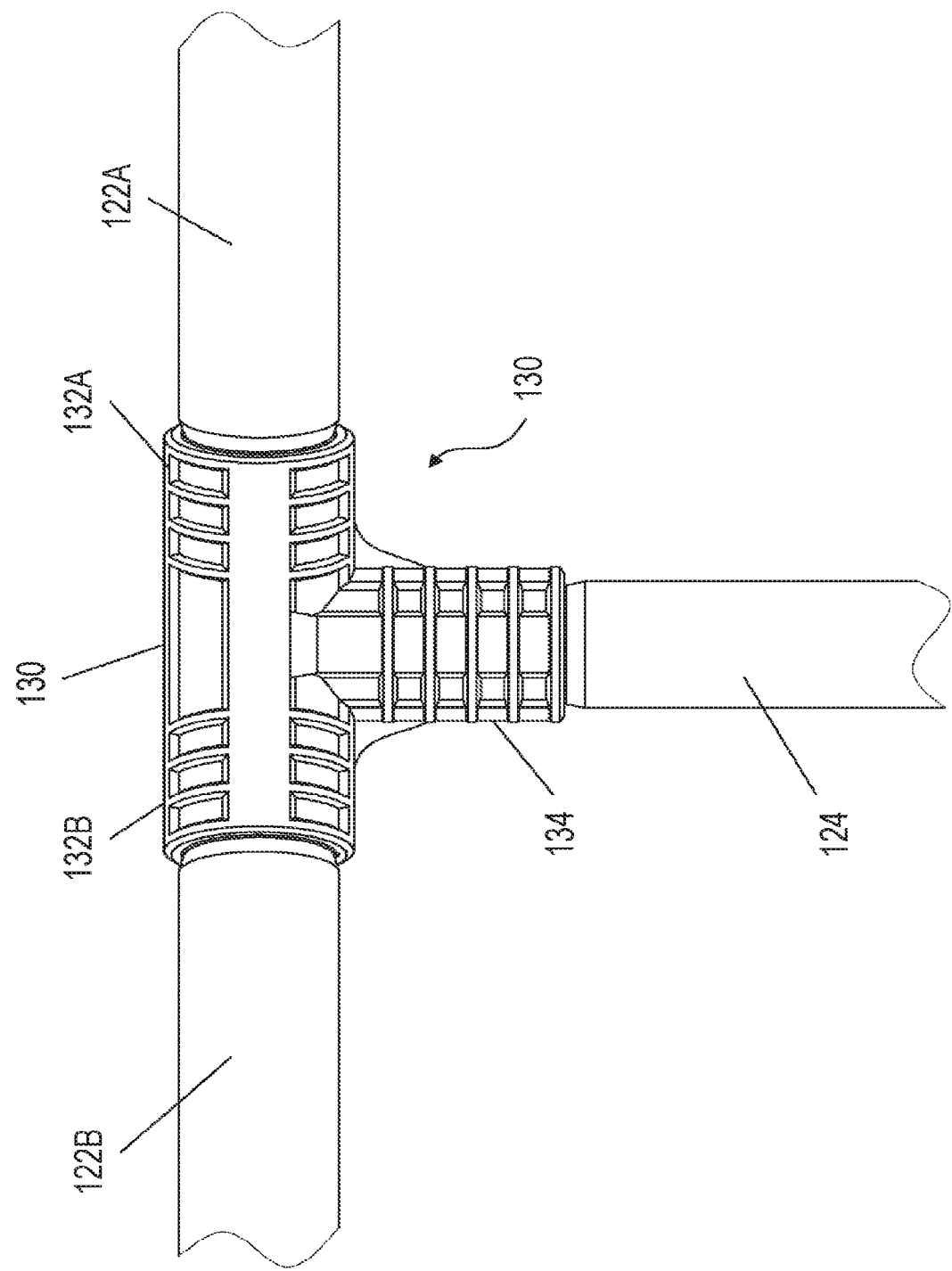
FIG. 5 is an elevational view of the T-shaped joint of FIG. 4 coupled to adjacent pipes.

Referring next to the illustrated embodiment of FIGS. 4 and 5, a two-piece T-joint 130 is provided including pieces 160, 162. The two-piece T-joint 130 of FIGS. 4 and 5 is similar to the above-described one-piece T-joint 30, with like reference numerals identifying like elements, except as described herein. The horizontal portions 132A, 132B together constitute the first piece 160 of the T-joint 130, and the vertical portion 134 constitutes the second piece 162 of the T-joint 130, with a horizontal seam 164 formed between the pieces 160, 162. The first piece 160 includes a first inner seat (not shown) disposed midway between the horizontal portions 132A, 132B, and the second piece 162 includes a second inner seat 163 disposed within the vertical portion 134. One or more fasteners 166 (e.g., screws) are provided to removably couple the first inner seat (not shown) of the first piece 160 to the second inner seat 163 of the second piece 162 along the scam 164.

The T-joint 130 may be assembled via friction-fit connections without the need for mechanical fasteners, as discussed above. Alternatively, the T-joint 130 may be mechanically fastened or otherwise coupled to the adjacent pipes 122A, 122B, 124 using corresponding coupling assemblies. Various coupling assemblies are shown and described below with respect to FIGS. 6-9. These coupling assemblies may be rearranged, interchanged, and/or combined, notwithstanding the particular embodiments shown and described below.

Figure 6:
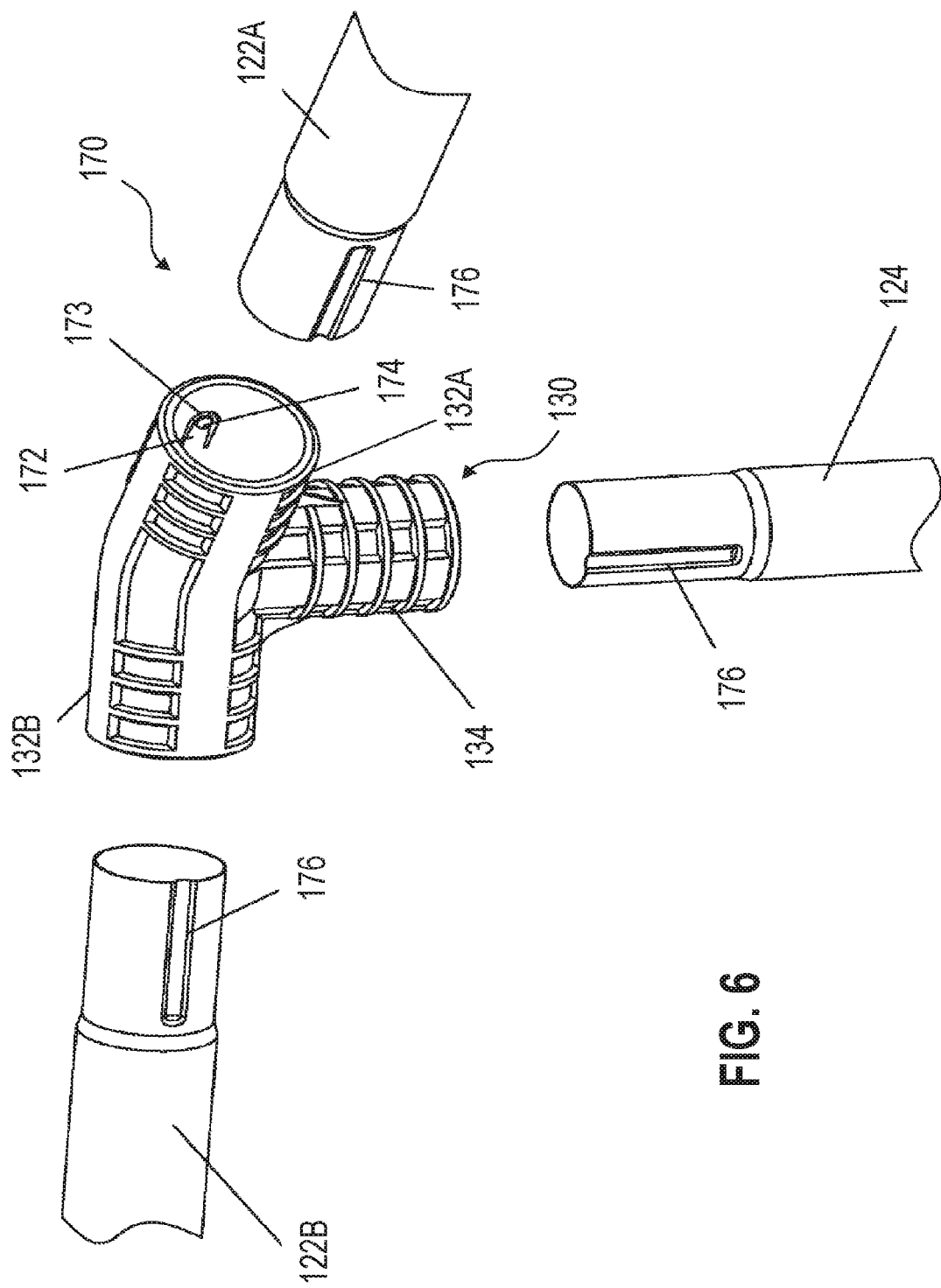
FIG. 6 is an exploded perspective view of a first coupling assembly between the T-shaped joint and the adjacent pipes.
Figure 7:
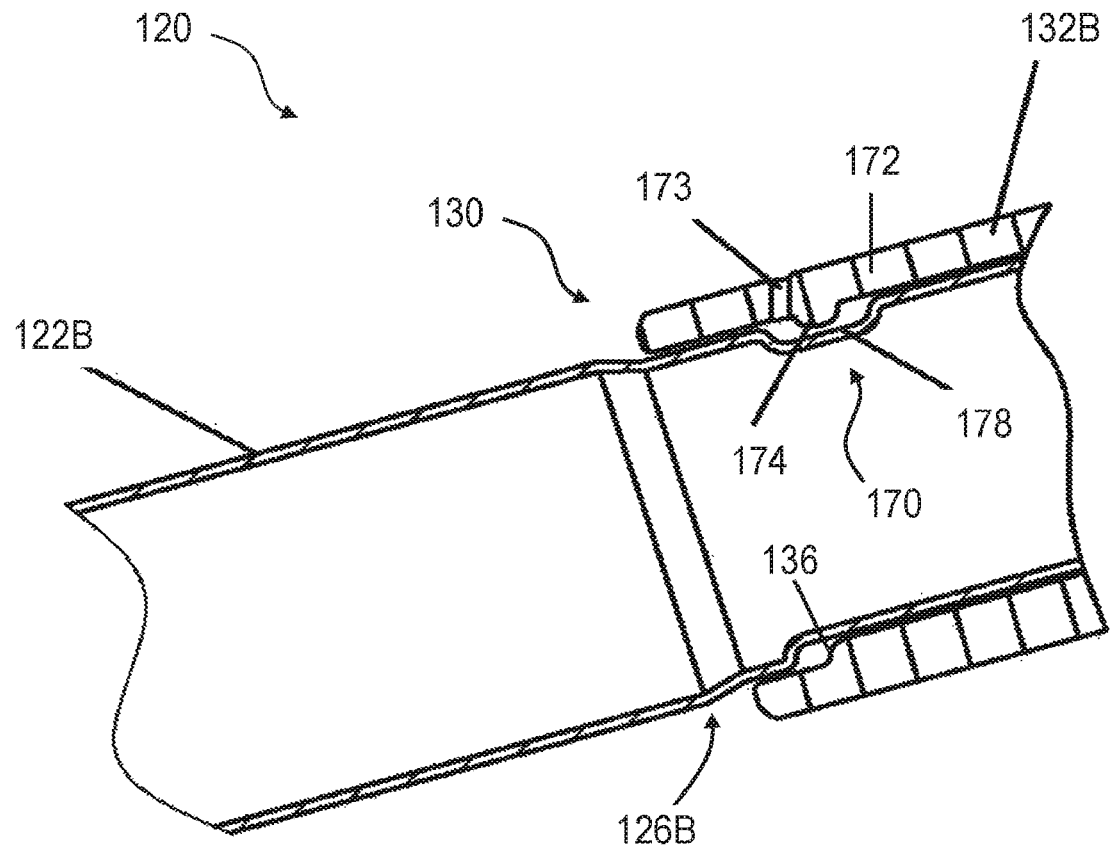
FIG. 7 is an assembled cross-sectional view of the first coupling assembly of FIG. 6.

Referring initially to FIGS. 6 and 7, a first coupling assembly 170 is shown for coupling each portion 132A, 132B, 134 of the T-joint 130 to the corresponding pipe 122A, 122B, 124. The coupling assembly 170 includes a cantilevered locking arm 172 on the corresponding portion 132A, 132B, 134 of the T-joint 130, wherein the locking arm 172 is partially surrounded by a slit 173 in the T-joint 130. The locking arm 172 includes a locking protrusion 174 at one end and is cantilevered from the T-joint 130 at the opposite end. The coupling assembly 170 also includes an elongate groove 176 with a locking recess 178 (FIG. 7) in the corresponding pipe 122A, 122B, 124. When connecting the T-joint 130 to each pipe 122A, 122B, 124, the corresponding locking arm 172 is guided through the aligned groove 176 until the locking protrusion 174 aligns with and snaps radially into the locking recess 178 (FIG. 7). When disconnecting the T-joint 130 from each pipe 122A, 122B, 124, the corresponding locking arm 172 is pulled radially outward to release the locking protrusion 174 from the locking recess 178, and then the locking arm 172 is guided out through the corresponding groove 176.

As noted above, adjacent components of the frame assembly 120 may have complimentary profiles over their lengths. As shown in FIG. 7, for example, the second horizontal portion 132B of the T-joint 130 narrows inwardly at step 136 to accommodate the narrowing end 126B of the adjacent horizontal pipe 122B.

Figure 8:
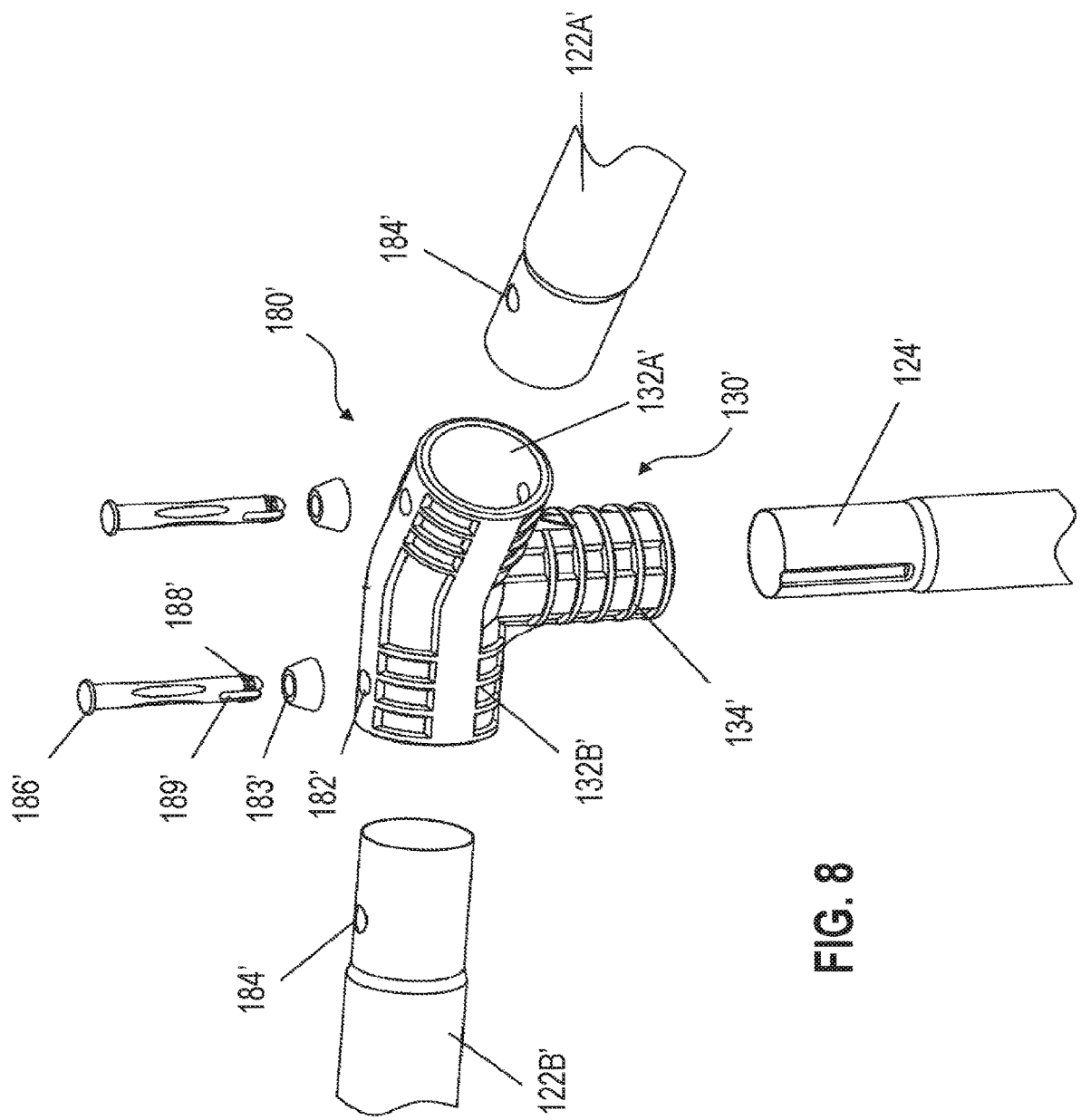
FIG. 8 is an exploded perspective view of a second coupling assembly between the T-shaped joint and the adjacent pipes.

Referring next to FIG. 8, a second coupling assembly 180' is shown for coupling each horizontal portion 132A', 132B' of the T-joint 130' to the corresponding horizontal pipe 122A', 122B'. The second coupling assembly 180' includes an outer through hole 182' in the corresponding horizontal portion 132A', 132B' of the T-joint 130' and an inner through hole 184' in the corresponding horizontal pipe 122A', 122B'. The second coupling assembly 180' also includes an optional ring or washer 183' surrounding the hole 182' in the T-joint 130'. The second coupling assembly 180' further includes a locking pin 186' having cantilevered locking arms 188' at its lower end, the locking arms 188' being separated by a slit 189' in the pin 186'. When connecting the T-joint 130' to each horizontal pipe 122A', 122B', the corresponding pin 186' is inserted through the optional ring 183' and through the aligned holes 182', 184' until the locking arms 188' of the pin 186' exit and separate beneath the T-joint 130'. When disconnecting the T-joint 130' from each horizontal pipe 122A', 122B', the locking arms 188' of the corresponding pin 186' are pressed together, and the pin 186' is lifted out of the aligned holes 182', 184'. The vertical portion 134' of the T-joint 130' may be coupled to the vertical pipe 124' using the above-described first coupling assembly 170' or another suitable coupling assembly.

Figure 9:
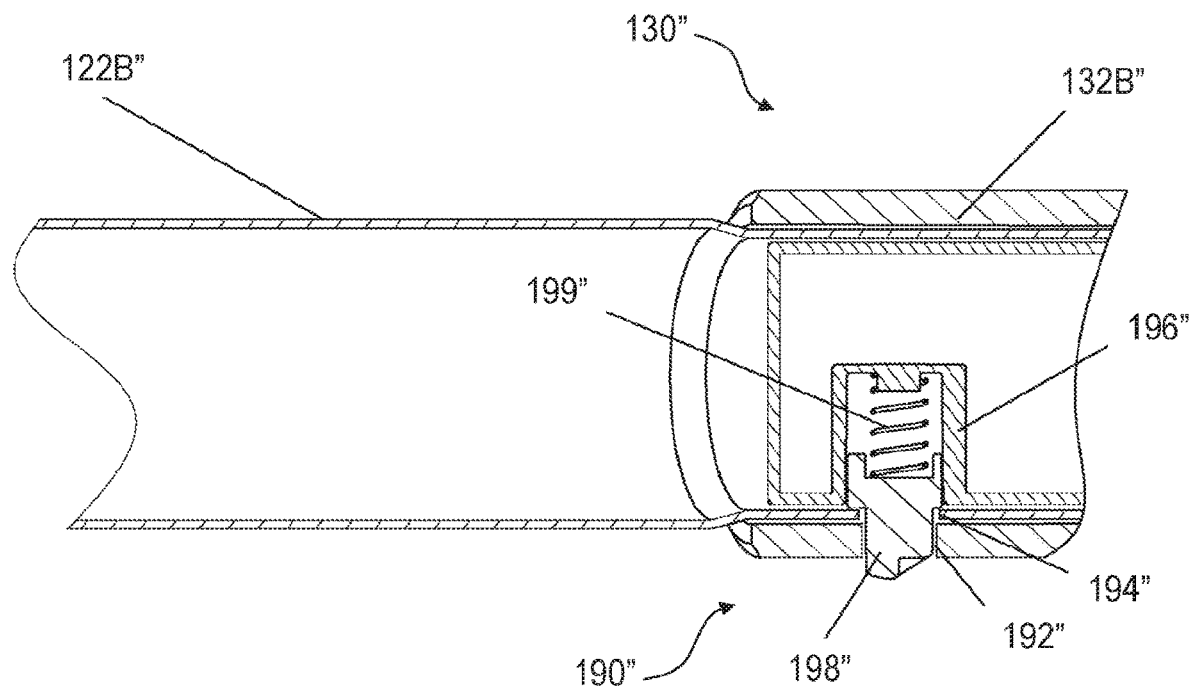
FIG. 9 is an assembled cross-sectional view of a third coupling assembly between the T-shaped joint and the adjacent pipes.

Referring next to FIG. 9, a third coupling assembly 190" is shown for coupling the horizontal portion 132B" of the T-joint 130" to the corresponding horizontal pipe 122B". The third coupling assembly 190" includes an outer hole 192" in the horizontal portion 132B" of the T-joint 130" and an inner hole 194" in the horizontal pipe 122B". The third coupling assembly 190" also includes a seat 196" formed within the horizontal pipe 122B", a lock 198" moveably disposed in the seat 196", and a spring 199" that biases the lock 198" radially outward. When connecting the T-joint 130" to the horizontal pipe 122B", the lock 198" is pressed radially inward until the holes 192", 194" align and the lock 198" springs radially outward through the aligned holes 192", 194". When disconnecting the T-joint 130" from the horizontal pipe 122B", the lock 198" is again pressed radially inward until the horizontal pipe 122B" and the lock 198" are separated from the T-joint 130". Although not shown in FIG. 9, the other portions of the T-joint 130" may use the same third coupling assembly 190" or another suitable coupling assembly.

Figure 10:
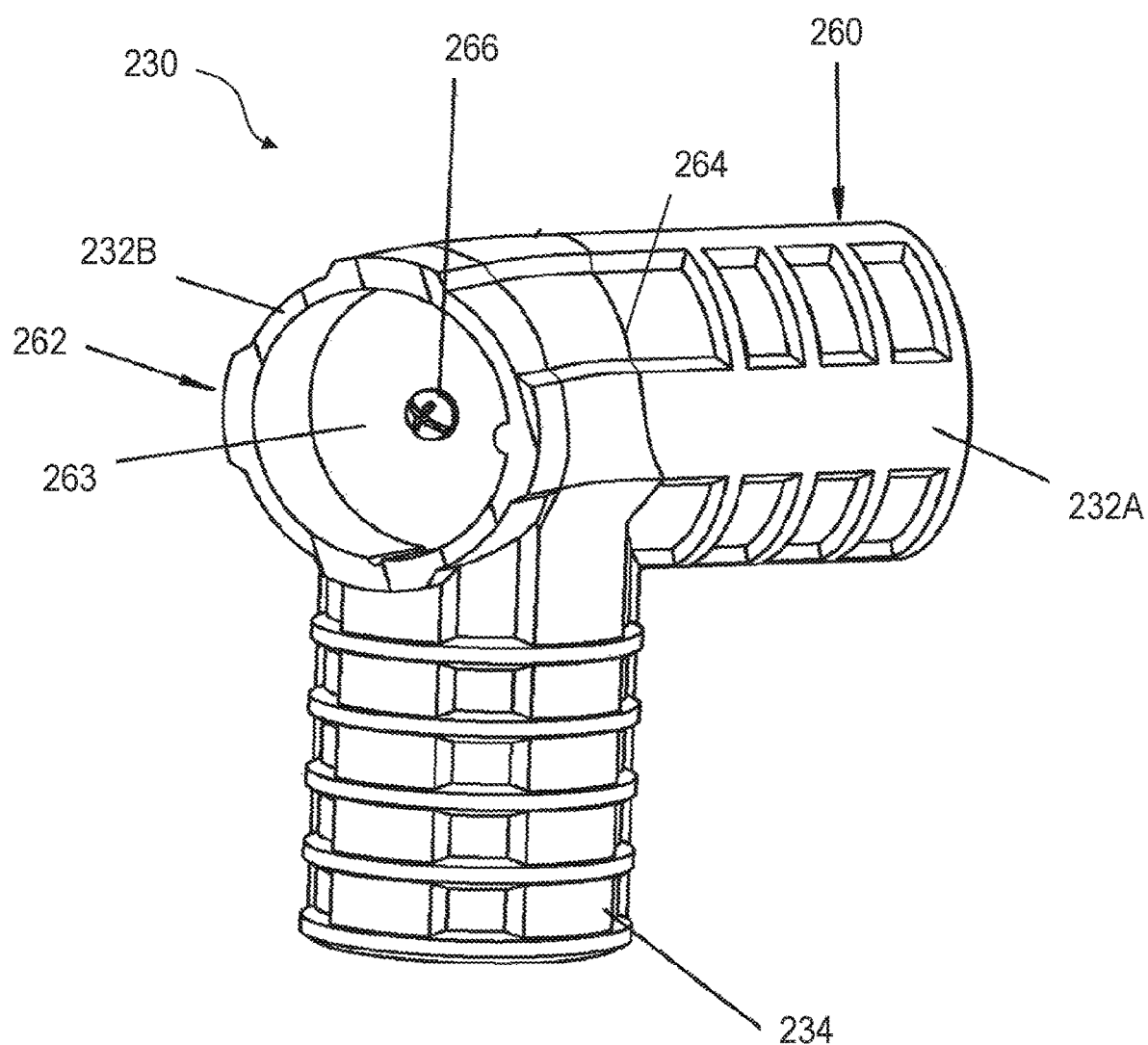
FIG. 10 is a side perspective view of another exemplary two-piece T-shaped joint of the present disclosure.

Referring next to the illustrated embodiment of FIG. 10, another two-piece T-joint 230 is provided including pieces 260, 262. The two-piece T-joint 230 of FIG. 10 is similar to the above-described T-joints 30, 130, with like reference numerals identifying like elements, except as described herein. The first horizontal portion 232A constitutes the first piece 260 of the T-joint 230, and the second horizontal portion 232B and the vertical portion 234 together constitute the second piece 262 of the T-joint 230, with a vertical seam 264 formed between the pieces 260, 262. The first piece 260 includes a first inner seat (not shown), and the second piece 262 includes a second inner seat 263 disposed midway between the horizontal portions 232A, 232B. One or more fasteners 266 (e.g., screws) are provided to removably couple the first inner seat (not shown) of the first piece 260 to the second inner seat 263 of the second piece 262 along the seam 264. The T-joint 230 may be assembled via friction-fit connections without the need for mechanical fasteners, as discussed above. Alternatively, the T-joint 230 may include one or more coupling assemblies (e.g., coupling assemblies 170, 180", 190" of FIGS. 6-9).

Figure 11:
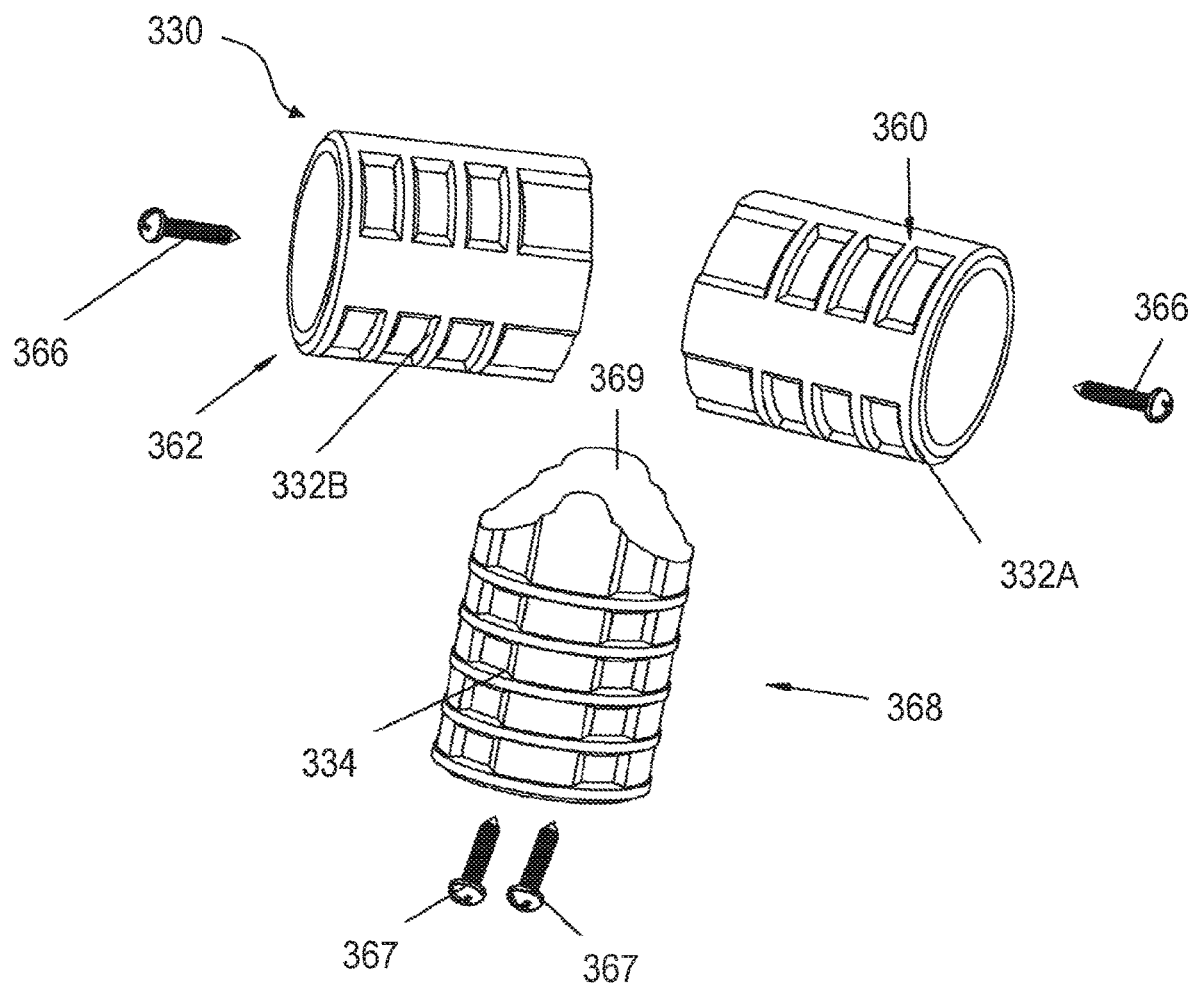
FIG. 11 is an exploded perspective view of an exemplary three-piece T-shaped joint of the present disclosure.

Referring next to the illustrated embodiment of FIG. 11, a three-piece T-joint 330 is provided including pieces 360, 362, 368. The three-piece T-joint 330 of FIG. 11 is similar to the above-described T-joints 30, 130, 230, with like reference numerals identifying like elements, except as described herein. The first horizontal portion 332A constitutes the first piece 360 of the T-joint 330, the second horizontal portion 332B constitutes the second piece 362 of the T-joint 330, and the vertical portion 334 constitutes the third piece 368 of the T-joint 330. The illustrative third piece 368 includes front and rear triangular-shaped extension walls 369 that extend upwardly to support and partially surround the first and second pieces 360, 362. Each piece 360, 362, 368, includes an inner seat (not shown). One or more horizontal fasteners 366 (e.g., screws) are provided to removably couple the first and second pieces 360, 362, together, and one or more vertical fasteners 367 are provided to removably couple the third piece 368 to one or both of the first and second pieces 360, 362. The T-joint 330 may be assembled via friction-fit connections without the need for mechanical fasteners, as discussed above. Alternatively, the T-joint 330 may include one or more coupling assemblies (e.g., coupling assemblies 170, 180", 190" of FIGS. 6-9).

Figure 12:
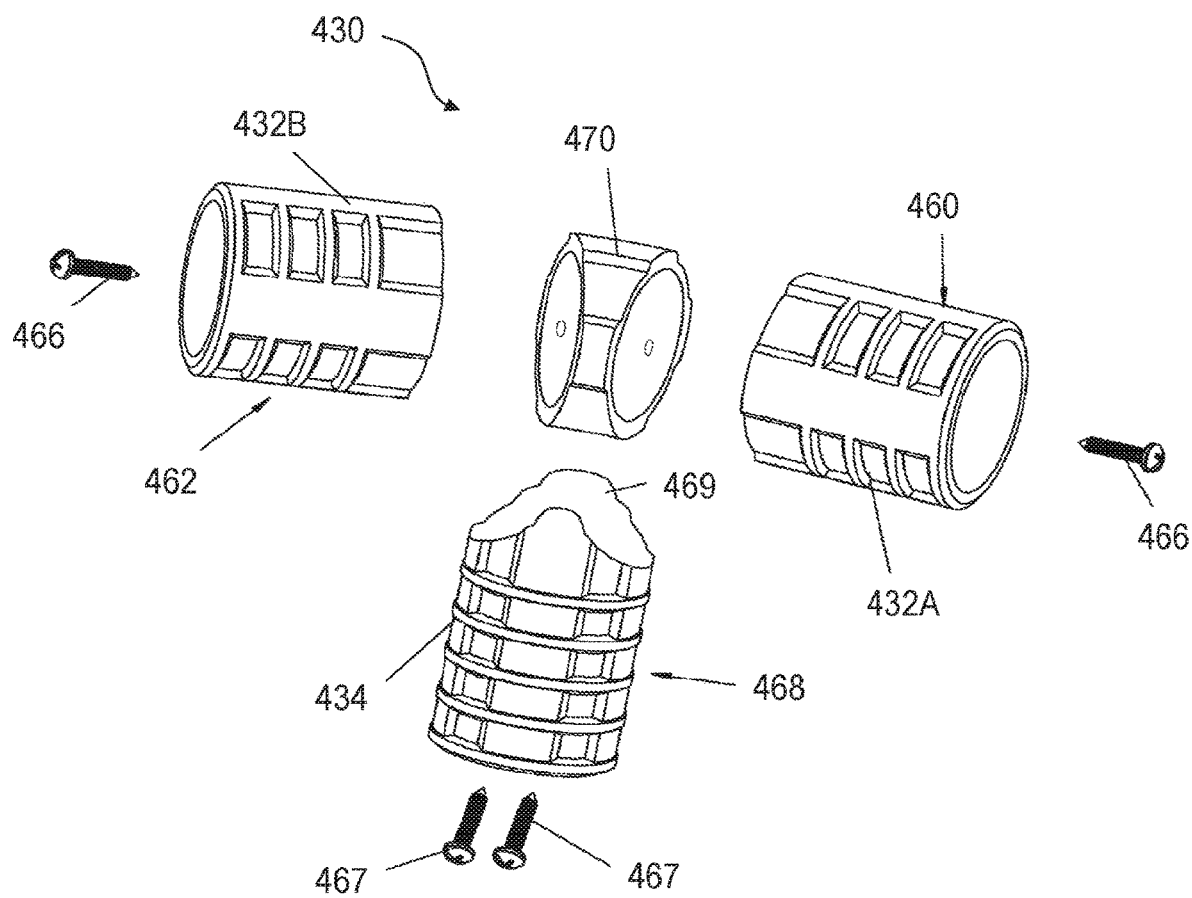
FIG. 12 is an exploded perspective view of an exemplary four-piece T-shaped joint of the present disclosure.

Referring next to the illustrated embodiment of FIG. 12, a four-piece T-joint 430 is provided including pieces 460, 462, 468, and 470. The four-piece T-joint 430 of FIG. 12 is similar to the above-described T-joints 30, 130, 230, 330, with like reference numerals identifying like elements, except as described herein. The first horizontal portion 432A constitutes the first piece 460 of the T-joint 430, the second horizontal portion 432B constitutes the second piece 462 of the T-joint 430, the vertical portion 434 constitutes the third piece 468 of the T-joint 430, and an intermediate seat constitutes the fourth piece 470 of the T-joint 430. The illustrative third piece 468 includes front and rear triangular-shaped extension walls 469 that extend upwardly to support and partially surround the fourth piece 470. One or more horizontal fasteners 466 (e.g., screws) are provided to removably couple the first and second pieces 460, 462, to the intermediate fourth piece 470, and one or more vertical fasteners 467 are provided to removably couple the third piece 468 to the intermediate fourth piece 470. The T-joint 430 may be assembled via friction-fit connections without the need for mechanical fasteners, as discussed above. Alternatively, the T-joint 430 may include one or more coupling assemblies (e.g., coupling assemblies 170, 180", 190" of FIGS. 6-9).

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A joint for an above ground pool having a frame assembly including a first horizontal frame, a second horizontal frame, and a vertical frame, the joint comprising:
   a first horizontal portion having a hollow end that receives a narrowing end of the first horizontal frame;
   a second horizontal portion having a hollow end that receives a narrowing end of the second horizontal frame; and
   a vertical portion positioned between the first and second horizontal portions, the vertical portion being configured to mate with the vertical frame;
   wherein the hollow ends of the first and the second horizontal portions narrow inwardly at a radial step to receive the corresponding narrowing ends.

2. The joint of claim 1, wherein the first and second horizontal portions form an included angle of less than 180 degrees.

3. The joint of claim 1, wherein:
   the vertical portion includes a hollow end that receives a narrowing end of the vertical frame, the hollow end of the vertical portion having an inner elliptical cross-section.

4. The joint of claim 1, wherein the joint is made of plastic.

5. The joint of claim 1, wherein the first horizontal portion, the second horizontal portion, and the vertical portion are integrally molded together to form a one-piece structure.

6. The frame assembly of claim 1, wherein the first horizontal portion and the second horizontal portion form an angle of between 120 degrees and 180 degrees.

7. An above ground pool comprising:
   a frame assembly comprising:
     a first horizontal frame that narrows at a first end;
     a second horizontal frame that narrows at a second end;
     a vertical frame; and
     a T-shaped joint coupled to the first horizontal frame, the second horizontal frame, and the vertical frame; and
   a liner supported by the frame assembly;
   wherein the T-shaped joint includes a first horizontal portion with a hollow end that narrows inwardly at a radial step to receive the first end, a second horizontal portion with a hollow end that narrows inwardly at a radial step to receive the second end, and a vertical portion configured to mate with the vertical frame.

8. The pool of claim 7, wherein the liner includes:
   an upper sleeve configured to receive the first and second horizontal frames, the upper sleeve defining a first horizontal area; and
   a side wall that defines a water cavity, the water cavity having a second horizontal area smaller than the first horizontal area.

9. The pool of claim 7, wherein the liner includes:
an upper sleeve configured to receive the first and second horizontal frames; and
a side wall that defines a water cavity, the side wall being located radially inward of the upper sleeve.

10. The pool of claim 7, wherein:
the first horizontal frame, the second horizontal frame, and the vertical frame are made of metal; and
the joint is made of plastic.

11. The pool of claim 7, wherein the joint is a one-piece structure.

12. The above ground pool of claim 7, wherein the liner includes a bottom wall, a side wall and an upper sleeve which receives the first and second horizontal frames and includes an opening corresponding to a position of the T-shaped joint, the bottom wall and the side wall defining a water cavity.

13. The above ground pool of claim 7, wherein the liner includes a side wall that defines a water cavity, the side wall including a water inlet and a water outlet to enable fluid communication between the water cavity and one of an external water filtration system and an external heating system.

14. A method of assembling an above ground pool comprising the steps of:
assembling a frame assembly including a plurality of T-shaped joints, the assembling step comprising coupling each joint to a first horizontal frame that narrows at a first end, to a second horizontal frame that narrows at a second end and to a vertical frame;
positioning a lower end of the vertical frame on a support surface; and
supporting a liner on the frame assembly;
wherein each joint includes a first horizontal portion with a hollow end that narrows inwardly at a radial step to receive the first end of the first horizontal frame, a second horizontal portion with a hollow end that narrows inwardly at a radial step to receive the second end of the second horizontal frame, and a vertical portion with a hollow end that mates with an upper end of the vertical frame.

15. The method of claim 14, wherein the supporting step comprises:
inserting the first and second horizontal frames in an upper sleeve of the liner; and
positioning a side wall of the liner radially inward of the upper sleeve.

16. The method of claim 14, wherein:
the first horizontal portion of each joint has a substantially continuous outer wall surrounding the first end of the first horizontal frame;
the second horizontal portion of each joint has a substantially continuous outer wall surrounding the second end of the second horizontal frame; and
the vertical portion is positioned between the first and second horizontal portions, the vertical portion having a continuous outer wall surrounding the upper end of the vertical frame.

17. The method of claim 14, wherein the assembling step includes introducing a vertical frame into a vertical open end of each joint, introducing a first horizontal frame into a first open end of a first horizontal portion of each joint, and introducing a second horizontal frame into a second open end of a second horizontal portion of each joint.

18. The method of claim 14, wherein coupling each joint to a first horizontal frame includes causing a lock to move radially into an outer perimeter hole of an outer wall of the first horizontal frame.

19. The method of claim 14, wherein the lock is supported by a seat located in the joint.

20. The method of claim 14, wherein assembling the frame assembly includes arranging each joint and the first horizontal frame and the second horizontal frame coupled to each joint to form a ring shape.

* * * * *